United States Patent
Bates et al.

(10) Patent No.: US 6,925,605 B2
(45) Date of Patent: Aug. 2, 2005

(54) COLLATING TABLE FOR EMAIL

(75) Inventors: Cary Lee Bates, Rochester, MN (US); Paul Reuben Day, Rochester, MN (US); Mark William Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 09/751,080

(22) Filed: Dec. 28, 2000

(65) Prior Publication Data

US 2003/0014490 A1 Jan. 16, 2003

(51) Int. Cl.[7] .......................... G06F 15/16; G06F 3/00; G06F 17/00
(52) U.S. Cl. ...................... 715/745; 709/201; 709/206; 709/207; 715/747
(58) Field of Search ................................. 709/201, 202, 709/206, 207, 217; 715/745, 747

(56) References Cited

U.S. PATENT DOCUMENTS 6,349,328 B1 * 2/2002 Haneda et al. .............. 709/206

2002/0095464 A1 * 7/2002 Meek ......................... 709/206

* cited by examiner

Primary Examiner—Paul H. Kang
(74) Attorney, Agent, or Firm—Dillon & Yudell, LLP; Roy W. Truelson

(57) ABSTRACT

A collating table containing user-defined sort criteria in ranked order is employed in sorting electronic mail messages for display to the user. Entries within the collating table prioritize unread and/or previously viewed messages based upon the address of the sender or similar attributes, and may each contain a specific username and domain address, a domain of user addresses, or a plurality of addresses of either type. Entries within the collating table may be fixed or dynamic, with dynamic entries automatically updated based on historical statistics relating to the frequency and/or speed of response by the user to messages previously received from the sender, speed of opening or deleting prior messages from the sender, or some user-specified combination of such attributes. Addresses within the dynamic entries may percolate up or down the ranking of the collating table, with aging employed in removing addresses from the collating table. Other users may be given access to portions of the collating table to rank their own messages to the user, and specific messages may be ranked within or above any messages received from addresses within the collating table until deleted.

21 Claims, 3 Drawing Sheets

COLLATING TABLE FOR EMAIL

BACKGROUND OF THE INVENTION

1. Technical Field

The present invention relates generally to displaying electronic mail messages and in particular to ordering electronic mail messages for display. Still more particularly, the present invention relates to sorting electronic mail messages based on a user-defined system of priority and displaying the messages in the order dictated by that system.

2. Description of the Related Art

Any electronic mail user who has returned from a business trip, vacation or other prolonged absence from work understands the frustration of finding dozens or even hundreds of new electronic mail messages ("e-mail messages" or "e-mails") in the user's account. Work-related e-mails typically number in the tens or hundreds of messages per day for a user, depending on the user's position within an enterprise. After adding in unsolicited promotional messages, messages from list servers or chat groups and the like, and other messages of a personal nature (such as stock alerts, electronic bills or bill reminders, bulk-mail circulations of items from acquaintances, and news or weather alerts), the number of messages which may confront a user after returning from a departure of a week or more may border on unmanageable.

Conventional e-mail client applications such as Microsoft Outlook or Novell Groupwise allow messages to be sorted based on the time the messages were sent in either forward or reverse chronological order, alphabetically by sender in ascending or descending order, or alphabetically by subject in ascending or descending order. New or "unread" messages may be displayed with different characteristics from messages which the user has already viewed (e.g., in boldface), but generally cannot be sorted separately from the previously viewed messages. In addition, usually only one sort criteria may be employed by the user at a time, rather than hierarchical or multi-tiered sorting (e.g., sort by sender and, for each unique sender, sort by subject). Messages, whether old or new, cannot be sorted based upon user-specified criteria.

It would be desirable, therefore, to enable sorting of e-mail messages according to user-specified criteria.

SUMMARY OF THE INVENTION

It is therefore one object of the present invention to provide improved display of electronic mail messages.

It is another object of the present invention to provide improved ordering of electronic mail messages for display.

It is yet another object of the present invention to enable sorting of electronic mail messages based on a user-defined system of priority and display of the messages in the order dictated by that system.

The foregoing objects are achieved as is now described. A collating table containing user-defined sort criteria in ranked order is employed in sorting electronic mail messages for display to the user. Entries within the collating table prioritize unread and/or previously viewed messages based upon the address of the sender or similar attributes, and may each contain a specific username and domain address, a domain of user addresses, or a plurality of addresses of either type. Entries within the collating table may be fixed or dynamic, with dynamic entries automatically updated based on historical statistics relating to the frequency and/or speed of response by the user to messages previously received from the sender, speed of opening or deleting prior messages from the sender, or some user-specified combination of such attributes. Addresses within the dynamic entries may percolate up or down the ranking of the collating table, with aging employed in removing addresses from the collating table. Other users may be given access to portions of the collating table to rank their own messages to the user, and specific messages may be ranked within or above any messages received from addresses within the collating table until deleted.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
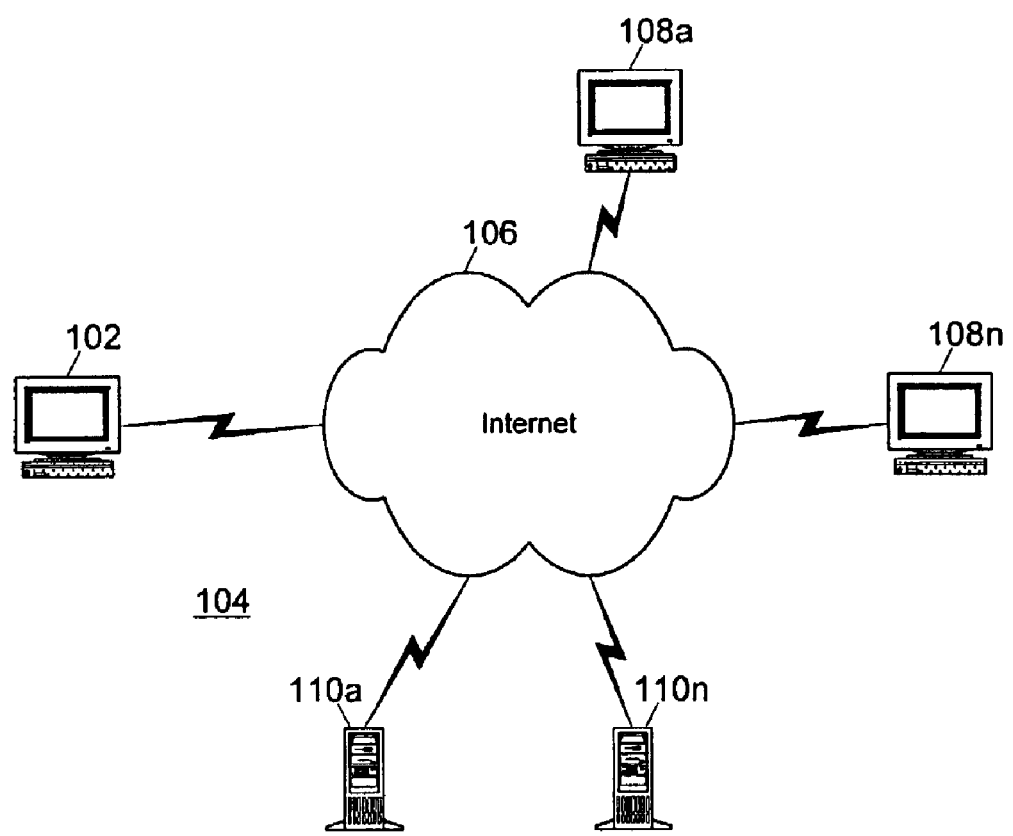
FIG. 1 depicts a data processing system and network in which a preferred embodiment of the present invention may be implemented.

With reference now to the figures, and in particular with reference to FIG. 1, a data processing system and network in which a preferred embodiment of the present invention may be implemented are depicted. Data processing system 102 forms part of a data processing system network 104 in which electronic mail messages may be transmitted in accordance with the known art. Data processing system 102 is connected to a network communications medium 106, which may include some combination of a local area network connection, dial-up access, and/or the Internet backbone. Data processing system 102 is employed by a user to access an electronic mail account in order to read and/or compose electronic mail messages in accordance with the known art.

Various user units 108a–108n, also coupled to network communications medium 106, may be employed to originate electronic mail messages directed to a user employing data processing system 102. Such electronic mail messages may be passed via one or more servers 110a–110n from the originating data processing systems 108a–108n to the data processing system 102 employed by the recipient user. The electronic mail system executing on the data processing systems within network 104 enables the recipient user of data processing system 102 to receive the electronic mail messages and includes the functionality described below for sorting the electronic mail messages based on user-specified priorities.

Figure 2:
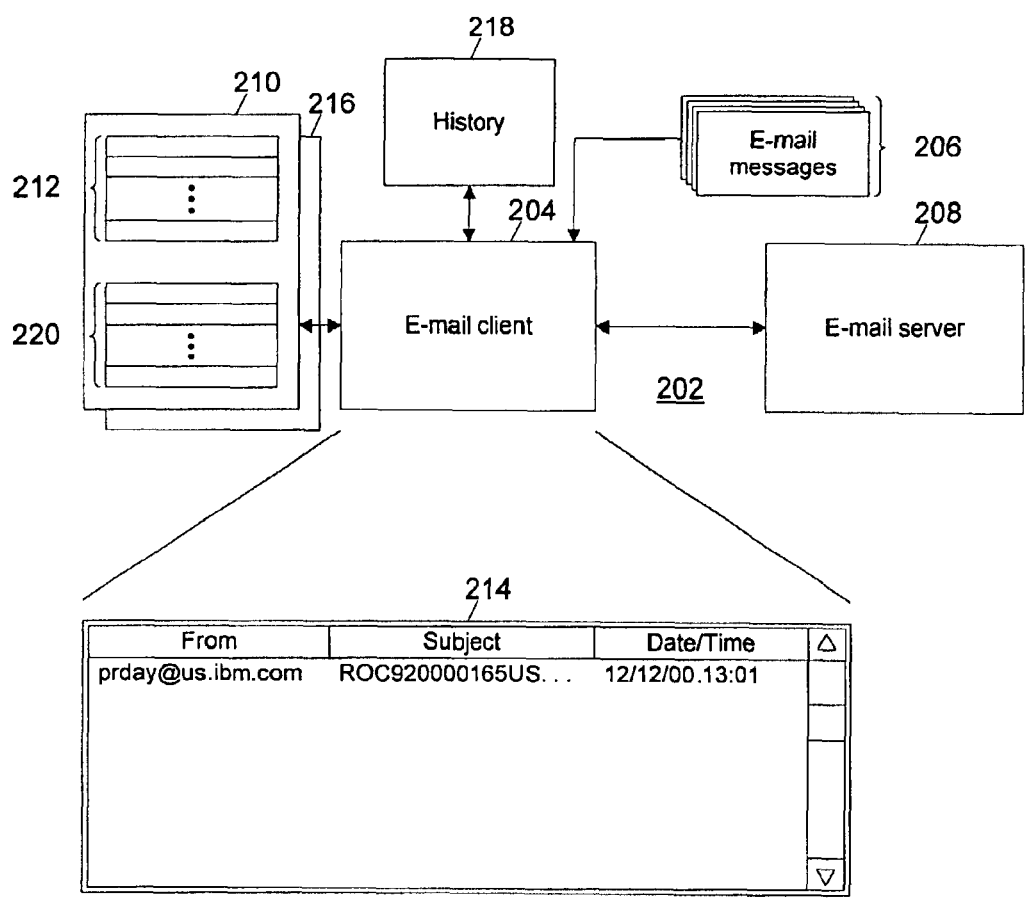
FIG. 2 is a block diagram of an electronic mail system in accordance with a preferred embodiment of the present invention.

Referring to FIG. 2, a block diagram of an electronic mail system in accordance with a preferred embodiment of the present invention is illustrated. Electronic mail system 202 executes on the data processing systems of network 104 depicted in FIG. 1, and is intended to be read in conjunction with FIG. 1. Electronic mail system 202 includes an electronic mail client application 204 for retrieving, ordering, and displaying electronic mail messages to the recipient user of data processing system 102. Client application 204 may execute within data processing system 102, or alternatively may execute within one of servers 110a–110n (e.g., a HyperText Transfer Protocol or World Wide Web server) which simply provides display information to, and receives user control signals from, data processing system 102.

Electronic mail client application 204 retrieves electronic mail messages 206 directed to the recipient user of data processing system 102 from electronic mail server application 208, which may execute on any of servers 110a–110n. Any existing mail protocol may be employed to transfer the electronic mail messages from server application 208 to client application 204.

In the present invention, electronic mail system 202 includes a user-defined collating table 210 specifying the sort order for electronic mail messages—either only new messages, both old and new messages, or old messages—for display. Entries within a sort order specification portion 212 of collating table 210 define the manner in which electronic mail messages are sorted for display within a user interface display 214 for the electronic mail client 204. Any electronic mail messages matching the criteria specified within the first entry of sort order specification section 212 are displayed first, any messages matching the criteria specified in the second entry of sort order specification section 212 are displayed after that, and so on. Messages matching the criteria specified at the top of the collating table 210 will be displayed first, with other message displayed below based on other sort criteria. If more than one electronic mail message matches the sort criteria specified within an entry in sort order specification section 212, those messages may be secondarily sorted by either a user-specified secondary sort criterion or by a default attribute such as date and time received. Messages matching none of the criteria specified within entries of the collating table 210 are displayed at the end, sorted (for example) based on time and date received or sender.

The sort criteria specified within entries in the collating table 210 are preferably electronic mail addresses, either whole or partial, which are compared to the "From" or sender fields of the electronic mail messages being sorted for display. An entry may contain a complete electronic mail address in the form "username@domainname.com," or may simply contain the domain name. Thus, for example, if the user wishes to set all electronic mail messages from coworkers to a specific priority within the sort order, the user may simply enter the domain name of the enterprise at which the user works within the corresponding collating table entry. On the other hand, if the user wishes to prioritize messages only from a particular individual within a large group having similar domain names within their electronic mail addresses (e.g., America Online users), the user may also specify the e-mail account username to be employed in matching to the sender field of messages being sorted.

Other sort criteria, such as terms within the subject line of a received message, may be employed within entries of the collating table 210. However, such criteria may be of limited usefulness in achieving a desired prioritization among received messages.

The sort criteria within collating table 210 may be applied only to new (unread) messages, or may be selectively applied at the user's option to both new and "old" (previously viewed) messages. Alternatively, separate collating tables 210 and 216 may be separately utilized for new and old messages, respectively.

The user-defined criteria within collating table 210 specify a sort order for newly received messages. For example, if a user receives messages from her manager, coworkers, family and friends, the user may wish the newly received messages from her manager to be displayed first within the listing of received messages, ahead of other messages which may be older but less important to the user.

The electronic mail client 204 may provide assistance in determining which criteria to employ within collating table 210 and whether such criteria should be placed high or low within the entries of collating table 210. Client 204 may track historical information 218 regarding a user's actions with respect to messages from a particular source and employ such information in providing guidance to the user in defining entries for the collating table 210.

For example, sender addresses within messages to which the user replies may "bubble" up towards the top of the collating table, with the addresses from the most recently replied to messages being higher than older messages. The fact that the user replies to messages from the corresponding address is an indication that the user considers the messages important. Messages from addresses to which the user never replies (e.g., promotional messages) are usually less urgent and need not be read first. Client 204 may count addresses replied to and create an intermediate "suggestion" collating sequence (not shown) from which the user may promote all or selected addresses to the actual collating table 210. Alternatively, client 204 may, at the user's direction, automatically promote addresses from frequently replied to messages to the actual collating table 210 under user-specified rules.

In this regard, collating table 210 may include a number of fixed entries 212 versus a number of dynamic entries 220. Fixed entries 212 specify sorting criteria which must be manually changed or deleted by the user, while dynamic entries 220 contain sorting criteria which are automatically changeable by client 204 based on monitored user actions. In this manner, sort criteria may "percolate" up or down the ranking of dynamic entries 220. Dynamic entries 220 may be interspersed in ranking with fixed entries 212, such as a configuration where the upper most entries of collating table 210 are fixed, followed by a number of dynamic entries, and concluding with another set of fixed entries for messages of least importance. The dynamic entries may be split, with a first set identifying messages which should be listed above messages which do not match any criteria specified in collating table 210 (higher priority than non-matching messages) and a second set identifying messages which should be listed after such messages (lower priority), with non-matching message, if any, displayed in between and sorted by default criteria (e.g., time and date).

Client 204 may also track the time interval between when a message is first viewed by or displayed to the user and when the user replies to that message. Addresses for messages which are replied to more quickly may be given priority over addresses for messages to which the user is slower in responding. A quick response to a message implies that the user is more interested in seeing future messages from the sender first. Additionally, frequency of response to messages from a given address may be employed in addition to or in lieu of speed of response. Client 204 may incorporate these addresses within the suggestion sequence or automatically promote these addresses into the actual collating table 210 based on user-defined rules.

Similar to tracking reply times, client 204 may also determine addresses from messages which are more quickly opened after first being presented to the user as compared to other new messages first presented at the same time. Such addresses may be weighted towards the top of collating table 210, since the implication of a user selecting a message first is that the user is more interested in messages from that sender. Alternatively, addresses from messages which are more quickly deleted (with or without being viewed by the user) may be weighted towards the bottom of the sort order within collating table 210 since quick deletion is an indicator that messages from that source are a low priority for the user, who would otherwise keep the messages longer.

The user may define rules for intermediate or automatic promotion of addresses to entries within collating table 210. The user may specify no rules, with messages being sorted by arrival date and time as in the existing art. Alternatively, the user may prioritize the system's rules to rank most frequently replied to addresses above more quickly replied to addresses, or to give less weight to the addresses of messages which are opened more quickly than others if the user prefers to open the least interesting messages first for quick deletion.

The presence of addresses within collating table 210 based on promotion for frequent or quick response or the like may be temporary. An aging formula may be provided to account for a flurry of correspondence within some time span (for example, relating to some project which is completed in due course), so that the relevant messages do not permanently skew the collating table. With the aging formula, addresses can be gradually moved down and/or off the collating table 210 as more recent or immediate messages alter the statistics.

For example, a user may change positions within an enterprise and/or be assigned to a new manager. Even though the user has received a lot of important e-mail from the former manager in the past, messages from that source (e.g., the user remains on the former manager's distribution list) may become a lower priority. Client 204 may determine that, because the user does not respond to messages from the former manager (and/or quickly deletes such messages), the priority of the address should be lowered. Despite the user having, for instance, ten messages from the former manager, if the user has not responded to any of the messages within some time interval such as ten days, the prior year's worth of correspondence should not bias the statistics and result in that address being placed at the top of collating table 210. After a defined period (such as a week or ten days) of the user deleting messages from a particular addresses without responding to them, the addresses should be automatically demoted by client 204 within the collating table 210, with further demotions occurring as additional time elapses. Instead of a raw period of time (such as a calendar week), client 204 may employ only "active" periods (e.g., days when the user actually logs in to check her messages) in computing aging.

Other users may be permitted to access collating table 210 for a user to dictate ordering of newly received messages. For example, a user's manager, by password control, may be permitted to access collating table 210 for the user to specify that messages from him (the user's manager) will always be displayed first within a listing of new messages. Upon management change, the new manager could replace the address within the first entry to his own address. The user may preclude other users from setting the highest order entries within collating table 210, reserving such designations to the user so that messages from the user's personal family (e.g., spouse, children, parents, siblings, etc.) are always listed above messages from the user's manager, if the user's manager specifies a priority within collating table 210. Entries may contain more than one criteria stated in the alternative, so that messages from any of the user's family members may all be assigned the highest priority.

Priorities within collating table 210 may also be assigned to specific messages. For example, if the recipient has a very important message which the users wishes to be displayed first in any listing, regardless of the fact that it has already been viewed, the message could be marked to be always listed first, regardless of the filter or "view" (e.g., "Unread messages only" or "All messages") currently applied to the user's in-box. Other specific messages could be assigned second and third priority, and so on.

Client 204 may also employ different color and icon designations for messages matching sort criteria specified within collating table 210. For example, mail sorted simply by default criteria such as date/time may be displayed in blue or black letters, while messages matching sorting criteria within the collating table 210 are displayed in red letters, or with yellow highlighting. For example, a boiling teapot icon utilized to signify "hot message" may be placed next to messages which match the highest order sorting criteria within collating table 210. Other user-defined icons, such as a bottle of Pepto Bismol, may be assigned by the user to collating table entries to identify messages corresponding to the entry as distasteful but important, or a waste basket icon for messages which are automatically sorted towards the bottom of a listing based on past user actions (e.g., quickly deleted messages).

Client 204 should also allow the user to switch between different views, such as with messages sorted by default criteria or sorted according to the collating table 210. Separate collating tables—for example, one for emphasizing work-related messages and one for emphasizing personal messages—may be employed, and the user allowed to switch quickly between views sorted by different collating tables.

Figure 3:
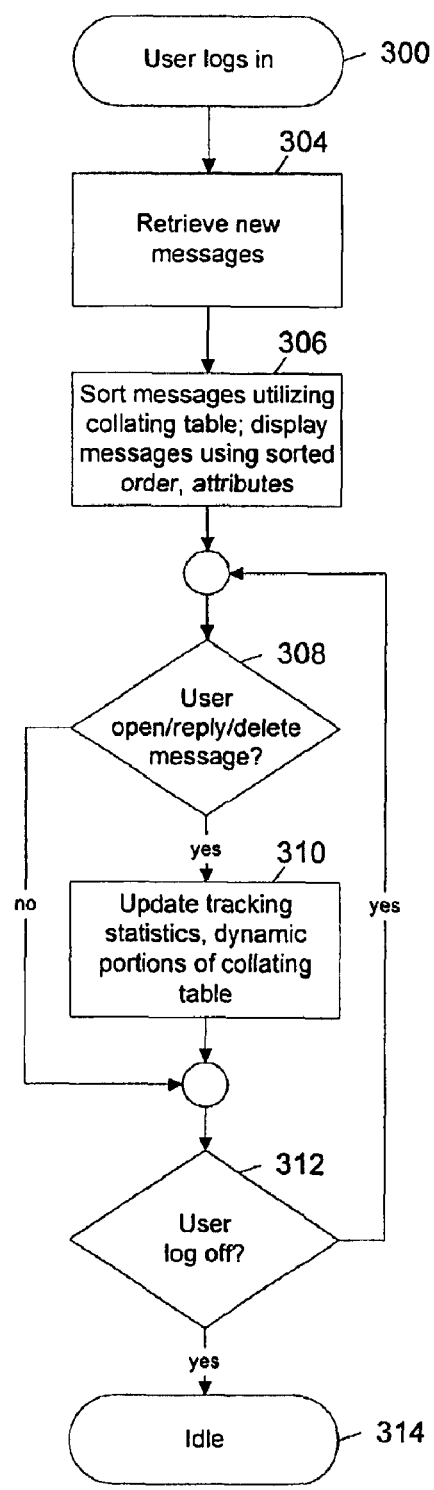
FIG. 3 is a high level flow chart for a process of employing a user-defined collating table in sorting messages for display in accordance with a preferred embodiment of the present invention.

With reference now to FIG. 3, a high level flow chart for a process of employing a user-defined collating table in sorting messages for display in accordance with a preferred embodiment of the present invention is depicted. The process begins at step 302, which depicts a user logging into an electronic mail account. The process first passes to step 304, which illustrates retrieving any new messages for the account, and then to step 306, which depicts sorting the messages—newly retrieved messages together with any previously retrieved but unread messages and optionally with any previously viewed messages which have not yet been deleted—utilizing the sorting criteria specified within a collating table (or an active collating table) for the user. The messages are then displayed for the user in the sort order defined by the collating table, and with the attributes and/or icons specified by the collating table for particular messages.

The process next passes to step 308, which illustrates a determination of whether the user has opened, replied to, or deleted any messages. If so, the process proceeds to step 310, which depicts updating the tracking statistics maintained for the user, and optionally updating dynamic portions of the collating table. Updating the collating table may alternatively be deferred until the user logs off or changes views; similarly, the display may be updated based on the immediate changes to the collating table, or such changes may be deferred until the user next logs in or changes views.

The process passes next to step 312, which illustrates a determination of whether the user has logged off. If not the process returns to step 308 to continue monitoring user actions. If so, however, the process proceeds instead to step 314, which illustrates the process becoming idle until the user next logs in.

The present invention allows user-specified criteria to be employed in sorting electronic mail messages for display to the user. In this manner, particular messages or groups of messages, or messages from specific individuals or groups, may be listed first within a display of electronic mail messages.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include:

nonvolatile, hard-coded type mediums such as read only memories (ROMs) or erasable, electrically programmable read only memories (EEPROMs), recordable type mediums such as floppy disks, hard disk drives and CD-ROMS, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of displaying electronic mail messages, comprising:

sorting a plurality of messages utilizing user-defined sort criteria including at least one criterion which is not alphabetic, chronological, or based on a previous viewing of corresponding messages;

ordering the plurality of messages according to the user-defined sort criteria; and displaying the plurality of messages in the order specified by the user-defined sort criteria;

wherein the step of sorting a plurality of messages utilizing user-defined sort criteria including at least one criterion which is not alphabetic, chronological or based on a previous viewing of corresponding messages further comprises sorting the plurality of messages based on a user-defined prioritization of a sender's address for each message;

wherein the step of sorting the plurality of messages based on a user-defined prioritization of a sender's address for each message further comprises comparing a sender's address for each message to a ranked list of senders' addresses:

wherein the step of comparing a sender's address for each message to a ranked list of senders' addresses further comprises:

comparing the sender's address for each message to a set of senders' addresses specified by a user as higher priority than other messages;

comparing the sender's address for each message to a set of senders' addresses automatically selected based on historical message tracking information as higher priority than other messages;

comparing the sender's address for each message to a set of senders' addresses specified by a user as lower priority than other messages; and comparing the sender's address for each message to a first set of senders' addresses automatically selected based on historical message tracking information as lower priority than other messages.

2. The method of claim 1, wherein the step of ordering the plurality of messages according to the user-defined sort criteria further comprises:

ordering the plurality of messages with any messages including a sender's address matching an address within a first entry within the ranked list listed first, with any messages including a sender's address matching an address within a second entry within the ranked list listed second, and with any messages including a sender's address matching an address within any subsequent entry within the ranked list listed at a corresponding position within an ordered listing of the plurality of messages.

3. A method of displaying electronic mail messages, comprising:

sorting a plurality of messages utilizing user-defined sort criteria including at least one criterion which is not alphabetic, chronological, or based on a previous viewing of corresponding messages;

ordering the plurality of messages according to the user-defined sort criteria; and displaying the plurality of messages in the order specified by the user-defined sort criteria;

wherein the step of sorting a plurality of messages utilizing user-defined sort criteria including at least one criterion which is not alphabetic, chronological or based on a previous viewing of corresponding messages further comprises sorting the plurality of messages based on a user-defined prioritization of a sender's address for each message;

wherein the step of sorting the plurality of messages based on a user-defined prioritization of a sender's address for each message further comprises comparing a sender's address within each message to addresses selected from a historical tracking of previous messages based upon rules specified by a user;

wherein the step of comparing a sender's address within each message to addresses selected from a historical tracing of previous messages based upon rules specified by a user further comprises at least one of:

selecting addresses from messages to which a user replies for higher listing within a sort order than addresses from messages to which the user never replies;

selecting addresses from messages to which a user replies more quickly than contemporaneous messages for higher listing within the sort order than other addresses;

selecting addresses from messages which a user opens more quickly than contemporaneous messages for higher listing within the sort order than other addresses;

selecting addresses from messages which a user opens more quickly than contemporaneous messages for lower listing within the sort order than other addresses; and selecting addresses from messages which a user deletes without opening for lower listing within the sort order than other addresses.

4. The method of claim 3, wherein the step of sorting the plurality of messages based on a user-defined prioritization of a sender's address for each message further comprises:

comparing a sender's address for each message to a ranked list of senders' addresses.

5. The method of claim 4, wherein the step of comparing a sender's address for each message to a ranked list of senders' addresses further comprises:

comparing the sender's address for each message to a ranked list of senders' addresses including a set of fixed entries specified by a user and a set of dynamic entries containing addresses selected from historical message tracking information based on rules specified by the user.

6. The method of claim 3, wherein the step of sorting the plurality of messages based on a user-defined prioritization of a sender's address for each message further comprises:

comparing a sender's address within each message to addresses specified by a user.

7. The method of claim 3, wherein the step of ordering the plurality of messages according to the user-defined sort criteria further comprises:

ordering the plurality of messages with any messages including a sender's address matching an address within a first entry within the ranked list listed first, with any messages including a sender's address matching an address within a second entry within the ranked list listed second, and with any messages including a sender's address matching an address within any subsequent entry within the ranked list listed at a corresponding position within an ordered listing of the plurality of messages.

8. A system for displaying electronic mail messages, comprising:

an electronic mail client application;

a plurality of messages;

means for sorting a plurality of messages utilizing user-defined sort criteria including at least one criterion which is not alphabetic, chronological, or based on a previous viewing of corresponding messages;

means for ordering the plurality of messages according to the user-defined sort criteria; and means for displaying the plurality of messages in the order specified by the user-defined sort criteria;

wherein the means for sorting a plurality of messages utilizing user-defined sort criteria including at least one criterion which is not alphabetic, chronological or based on a previous viewing of corresponding messages further comprises means for sorting the plurality of messages based on a user-defined prioritization of a sender's address for each message;

wherein the means for sorting the plurality of messages based on a user-defined prioritization of a sender's address for each message further comprises comparing a sender's address for each message to a ranked list of senders' addresses;

wherein the means for comparing a sender's address for each message to a ranked list of senders' addresses further comprises:

means for comparing the sender's address for each message to a set of senders' addresses specified by a user as higher priority than other messages;

means for comparing the sender's address for each message to a set of senders' addresses automatically selected based on historical message tracking information as higher priority than other messages;

means for comparing the sender's address for each message to a set of senders' addresses specified by a user as lower priority than other messages; and means for comparing the sender's address for each message to a first set of senders' addresses automatically selected based on historical message tracking information as lower priority than other messages.

9. The system of claim 8, wherein the means for ordering the plurality of messages according to the user-defined sort criteria further comprises:

means for ordering the plurality of messages with any messages including a sender's address matching an address within a first entry within the ranked list listed first, with any messages including a sender's address matching an address within a second entry within the ranked list listed second, and with any messages including a sender's address matching an address within any subsequent entry within the ranked list listed at a corresponding position within an ordered listing of the plurality of messages.

10. A system for displaying electronic mail messages, comprising:

an electronic mail client application;

a plurality of messages;

means for sorting a plurality of messages utilizing user-defined sort criteria including at least one criterion which is not alphabetic, chronological, or based on a previous viewing of corresponding messages;

means for ordering the plurality of messages according to the user-defined sort criteria; and means for displaying the plurality of messages in the order specified by the user-defined sort criteria;

wherein the means for sorting a plurality of messages utilizing user-defined sort criteria including at least one criterion which is not alphabetic, chronological or based on a previous viewing of corresponding messages further comprises means for sorting the plurality of messages based on a user-defined prioritization of a sender's address for each message;

wherein the means for sorting the plurality of messages based on a user-defined prioritization of a sender's address for each message further comprises means for comparing a sender's address within each message to addresses selected from a historical tracking of previous messages based upon rules specified by a user;

wherein the means for comparing a sender's address within each message to addresses selected from a historical tracing of previous messages based upon rules specified by a user further comprises at least one of:

means for selecting addresses from messages to which a user replies for higher listing within a sort order than addresses from messages to which the user never replies;

means for selecting addresses from messages to which a user replies more quickly than contemporaneous messages for higher listing within the sort order than other addresses;

means for selecting addresses from messages which a user opens more quickly than contemporaneous messages for higher listing within the sort order than other addresses;

means for selecting addresses from messages which a user opens more quickly than contemporaneous messages for lower listing within the sort order than other addresses; and means for selecting addresses from messages which a user deletes without opening for lower listing within the sort order than other addresses.

11. The system of claim 10, wherein the means for sorting the plurality of messages based on a user-defined prioritization of a sender's address for each message further comprises:
comparing a sender's address for each message to a ranked list of senders' addresses.

12. The system of claim 11, wherein the means for comparing a sender's address for each message to a ranked list of senders' addresses further comprises:
means for comparing the sender's address for each message to a ranked list of senders' addresses including a set of fixed entries specified by a user and a set of dynamic entries containing addresses selected from historical message tracking information based on rules specified by the user.

13. The system of claim 10, wherein the means for sorting the plurality of messages based on a user-defined prioritization of a sender's address for each message further comprises:
means for comparing a sender's address within each message to addresses specified by a user.

14. The system of claim 10, wherein the means for ordering the plurality of messages according to the user-defined sort criteria further comprises:
means for ordering the plurality of messages with any messages including a sender's address matching an address within a first entry within the ranked list listed first, with any messages including a sender's address matching an address within a second entry within the ranked list listed second, and with any messages including a sender's address matching an address within any subsequent entry within the ranked list listed at a corresponding position within an ordered listing of the plurality of messages.

15. A computer program product within a computer usable medium for displaying electronic mail messages, comprising:
instructions for sorting a plurality of messages utilizing user-defined sort criteria including at least one criterion which is not alphabetic, chronological, or based on a previous viewing of corresponding messages;
instructions for ordering the plurality of messages according to the user-defined sort criteria; and
instructions for displaying the plurality of messages in the order specified by the user-defined sort criteria;
wherein the instructions for sorting a plurality of messages utilizing user-defined sort criteria including at least one criterion which is not alphabetic, chronological or based on a previous viewing of corresponding messages further comprises instructions for sorting the plurality of messages based on a user-defined prioritization of a sender's address for each message;
wherein the instructions for sorting the plurality of messages based on a user-defined prioritization of a sender's address for each message further comprises comparing a sender's address for each message to a ranked list of senders' addresses;
wherein the instructions for comparing a sender's address for each message to a ranked list of senders' addresses further comprises:
instructions for comparing the sender's address for each message to a set of senders' addresses specified by a user as higher priority than other messages;
instructions for comparing the sender's address for each message to a set of senders' addresses automatically selected based on historical message tracking information as higher priority than other messages;
instructions for comparing the sender's address for each message to a set of senders' addresses specified by a user as lower priority than other messages; and
instructions for comparing the sender's address for each message to a first set of senders' addresses automatically selected based on historical message tracking information as lower priority than other messages.

16. The computer program product of claim 15, wherein the instructions for ordering the plurality of messages according to the user-defined sort criteria further comprises:
instructions for ordering the plurality of messages with any messages including a sender's address matching an address within a first entry within the ranked list listed first, with any messages including a sender's address matching an address within a second entry within the ranked list listed second, and with any messages including a sender's address matching an address within any subsequent entry within the ranked list listed at a corresponding position within an ordered listing of the plurality of messages.

17. A computer program product within a computer usable medium for displaying electronic mail messages, comprising:
instructions for sorting a plurality of messages utilizing user-defined sort criteria including at least one criterion which is not alphabetic, chronological, or based on a previous viewing of corresponding messages;
instructions for ordering the plurality of messages according to the user-defined sort criteria; and
instructions for displaying the plurality of messages in the order specified by the user-defined sort criteria;
wherein the instructions for sorting a plurality of messages utilizing user-defined sort criteria including at least one criterion which is not alphabetic, chronological or based on a previous viewing of corresponding messages further comprises instructions for sorting the plurality of messages based on a user-defined prioritization of a sender's address for each message;
wherein the instructions for sorting the plurality of messages based on a user-defined prioritization of a sender's address for each message further comprises instructions for comparing a sender's addresses within each message to addresses selected from a historical tracking of previous messages based upon rules specified by a user;
wherein the instructions for comparing a sender's address within each message to addresses selected from a historical tracing of previous messages based upon rules specified by a user further comprises at least one of:
instructions for selecting addresses from messages to which a user replies for higher listing within a sort order than addresses from messages to which the user never replies;
instructions for selecting addresses from messages to which a user replies more quickly than contemporaneous messages for higher listing within the sort order than other addresses;
instructions for selecting addresses from messages which a user opens more quickly than contemporaneous messages for higher listing within the sort order than other addresses;

instructions for selecting addresses from messages which a user opens more quickly than contemporaneous messages for lower listing within the sort order than other addresses; and instructions for selecting addresses from messages which a user deletes without opening for lower listing within the sort order than other addresses.

18. The computer program product of claim 17, wherein the instructions for sorting the plurality of messages based on a user-defined prioritization of a sender's address for each message further comprises:

comparing a sender's address for each message to a ranked list of senders' addresses.

19. The computer program product of claim 18, wherein the instructions for comparing a sender's address for each message to a ranked list of senders' addresses further comprises:

instructions for comparing the sender's address for each message to a ranked list of senders' addresses including a set of fixed entries specified by a user and a set of dynamic entries containing addresses selected from historical message tracking information based on rules specified by the user.

20. The computer program product of claim 17, wherein the instructions for sorting the plurality of messages based on a user-defined prioritization of a sender's address for each message further comprises:

instructions for comparing a sender's address within each message to addresses specified by a user.

21. The computer program product of claim 17, wherein the instructions for ordering the plurality of messages according to the user-defined sort criteria further comprises:

instructions for ordering the plurality of messages with any messages including a sender's address matching an address within a first entry within the ranked list listed first, with any messages including a sender's address matching an address within a second entry within the ranked list listed second, and with any messages including a sender's address matching an address within any subsequent entry within the ranked list listed at a corresponding position within an ordered listing of the plurality of messages.

* * * * *